United States Patent [19]

Ikeno et al.

[11] Patent Number: 5,571,853
[45] Date of Patent: Nov. 5, 1996

[54] GEL-FORMING SILICONE COMPOSITION

[75] Inventors: Masayuki Ikeno, Maebashi; Hironao Fujiki, Takasaki, both of Japan

[73] Assignee: Shin-Etsu Chemical Co., Ltd., Tokyo, Japan

[21] Appl. No.: 504,489

[22] Filed: Jul. 20, 1995

Related U.S. Application Data

[63] Continuation of Ser. No. 193,862, Feb. 9, 1994, abandoned.

[30] Foreign Application Priority Data

Feb. 9, 1993 [JP] Japan ................. 5-044671

[51] Int. Cl.⁶ ................................ C08K 5/54
[52] U.S. Cl. .................. 524/268; 524/588; 525/478; 528/15; 528/31; 528/32
[58] Field of Search .................... 524/268, 588; 525/478; 528/15, 31, 32

[56] References Cited

U.S. PATENT DOCUMENTS

| | | | |
|---|---|---|---|
| 4,988,779 | 1/1991 | Medford et al. | 525/479 |
| 5,204,437 | 4/1993 | Ikeno et al. | 525/478 |
| 5,216,104 | 6/1993 | Oleami et al. | 525/478 |

FOREIGN PATENT DOCUMENTS

| | | | |
|---|---|---|---|
| 371405 | 6/1990 | European Pat. Off. | 524/268 |
| 477984 | 4/1992 | European Pat. Off. | 524/268 |
| 490321 | 6/1992 | European Pat. Off. | 524/268 |

*Primary Examiner*—Mark D. Sweet
*Attorney, Agent, or Firm*—Oblon, Spivak, McClelland, Maier & Neustadt, P.C.

[57] ABSTRACT

A gel-forming silicone composition comprising (A) an organopolysiloxane containing a silicon-bonded alkenyl group or groups in an average amount of from 0.15 to 0.35 mol % based on all silicon-bonded organic groups contained per molecule, (B) a non-functional organopolysiloxane, (C) an organohydrogenpolysiloxane containing an average of 2 silicon-bonded hydrogen atoms per molecule, and (D) an addition reaction catalyst. The silicone composition is able to give a gel-like cured silicone product with low modulus of elasticity while retaining flexibility.

6 Claims, No Drawings

GEL-FORMING SILICONE COMPOSITION

This is a continuation of application Ser. No. 08/193,862, filed on Feb. 9, 1994, now abandoned.

BACKGROUND OF THE INVENTION

1. Field of the Invention

The present invention relates to a gel-forming silicone composition with low modulus of elasticity for use in protecting electrical and electronic components, and to a cured product of the same.

2. Description of the Prior Art

Silicone gels are known as cured silicone products which have so-called "rubber hardness" values of 0 because of their extremely low crosslink density, as contrasted to other cured silicone compositions such as elastomers and resins.

Silicone gels, with their excellent electrical insulation properties as well as stability of electrical characteristics and flexibility, are used as potting or encapsulating materials for electrical and electronic component parts, particularly as coating materials for protecting control circuit components such as power transistors, IC's, capacitors and the like from thermal and mechanical disorders.

As a material for forming a silicone gel, there have been known a variety of addition-curable type organopolysiloxane compositions, including, for example, those which comprise an organopolysiloxane containing a silicon-bonded vinyl group and an organohydrogenpolysiloxane containing a silicon-bonded hydrogen atom wherein the amount of the silicon-bonded hydrogen atoms relative to the amount of the silicon-bonded vinyl groups is reduced to a very low level, i.e. about 0.3 to 0.6 silicon-bonded hydrogen atoms per silicon-bonded vinyl group, and those which comprise an organopolysiloxane containing a statistical average of from 0.1 to 2 vinyl groups per molecule (Refer to Japanese Pre-examination Patent Publication (KOKAI) Nos. 56-143241, 62-039658, 62-039659, 63-035655, and 63-033475.).

However, with the progress in electrical and electronic component parts and the trend toward higher power and miniaturization in recent years, the silicone gel used for protection of the component parts has come to suffer a thermal stress arising, for example, from the heat generated by the circuit components themselves, variations in environmental conditions under which the component parts are used, and so forth. The thermal stress generated in the silicone gel would lead to breakage of semiconductor device or the like.

This problem is due to the fact that the conventional silicone gels used for the above purpose have high moduli of elasticity and, hence, produce stresses at the areas of contact with the circuit components.

SUMMARY OF THE INVENTION

It is accordingly an object of the present invention to provide a gel-forming silicone composition capable of giving a silicone gel with low modulus of elasticity while retaining good flexibility.

The above object can be attained according to the present invention which is based on the finding that a composition comprising an organopolysiloxane containing a specified amount of alkenyl groups per molecule, a non-functional organopolysiloxane and a bifunctional organohydrogenpolysiloxane is able to form a silicone gel with low modulus of elasticity while retaining a penetration at the same level as those of similar compositions according to the prior art.

Namely, the present invention provides a gel-forming silicone composition comprising:

(A) an organopolysiloxane containing a silicon-bonded alkenyl group in an average amount of from 0.15 to 0.35 mol % based on the amount of all silicon-bonded organic groups contained per molecule;
(B) a non-functional organopolysiloxane;
(C) an organohydrogenpolysiloxane containing an average of from 1 to 3 silicon-bonded hydrogen atoms per molecule; and
(D) an addition reaction catalyst.

Also, the present invention provides a gel-like cured product obtained by curing the aforementioned composition (hereinafter, the gel-like cured product may also be referred to simply as gel).

According to the present invention, a gel-like cured silicone product can be obtained which has a low modulus of elasticity while retaining flexibility. Therefore, the gel-forming silicone composition of the present invention is especially suited to use as a protecting material for circuit components, such as automobile semiconductor devices, etc., which need protection from external influences, for example, shocks, vibrations, heat and so forth.

The gel-like cured product herein refers to a cured product which has a penetration, as measured using a ¼-scale cone according to the method specified in ASTM D 1403, of from 0 to 200.

DETAILED DESCRIPTION OF PREFERRED EMBODIMENTS

(A) Alkenyl Group-Containing Organopolysiloxane

The alkenyl group-containing organopolysiloxane contains a silicon-bonded alkenyl group or groups in an average amount of from 0.15 to 0.35 mol %, preferably from 0.2 to 0.3 mol %, based on the amount of all silicon-bonded organic groups contained per molecule. Where the average amount of the alkenyl groups is less than 0.15 mol %, it is difficult to obtain a gel-like cured product with a lowered modulus of elasticity. The alkenyl groups may each be bonded to a silicon atom located at an intermediate position in the molecular chain or to a silicon atom located at a terminal end of the molecular chain of the organopolysiloxane.

The alkenyl group-containing organopolysiloxane includes, for example, a linear or branched organopolysiloxane having the following average composition formula (1):

$$(R^1)_a(R^2)_b SiO_{(4-a-b)/2} \tag{1}$$

wherein $R^1$ is an alkenyl group, $R^2$ is a substituted or unsubstituted monovalent hydrocarbon group, and a and b have values such that $0<b<3$ and $0.0015 \leq a/(a+b) \leq 0.0035$.

In the above formula (1), $R^1$ is preferably an alkenyl group of from 2 to 8 carbon atoms. Specific examples include vinyl, allyl, 1-butenyl, and 1-hexenyl groups and the like.

In the formula (1), besides, $R^2$ is a substituted or unsubstituted monovalent hydrocarbon group, and two $R^2$'s may together form a lower alkylene group. Examples of $R^2$ include alkyl groups such as methyl, ethyl, propyl, isopropyl, butyl, octyl, and the like; cycloalkyl groups such as cyclopentyl, cyclohexyl, cyclobutyl and the like; aryl groups such as phenyl, tolyl, xylyl, naphthyl and the like; aralkyl groups such as benzyl, phenylethyl, phenylpropyl and the like; and groups derived from these hydrocarbon groups by substitution of part or all of the carbon-bonded hydrogen atoms in these hydrocarbon groups with a halogen atom (e.g., a chlorine atom, fluorine atom, bromine atom or the like), cyano group or the like, the derived groups including, for example, halogenated hydrocarbon groups such as chloromethyl, trifluoropropyl, chlorophenyl, dibromophenyl, tetrachlorophenyl, difluorophenyl and the like, cyanoalkyl groups such as beta-cyanoethyl, gamma-cyanopropyl, beta-cyanopropyl and the like. The lower alkylene group which may be formed from two $R^2$'s includes, for example, ethylene, trimethylene, methylmethylene, tetramethylene and hexamethylene groups, and the like.

The alkenyl group-containing organopolysiloxanes for use as component (A) may be used either singly or in combination of two or more.

The component (A) preferably has a viscosity at 25° C of the order of 400 to 3000 cP, in view of ensuring that the composition obtained will have a suitable fluidity before cure and exhibit stable physical properties after cure where it is used for casting, potting, coating, impregnation, adhesion or the like. (B) Non-Functional Organopolysiloxane The non-functional organopolysiloxane includes, for example, a linear or branched non-functional organopolysiloxane having the following average composition formula (2):

$$(R^3)_c SiO_{(4-c)/2} \tag{2}$$

wherein $R^3$ is a substituted or unsubstituted non-functional monovalent hydrocarbon group, and c has a value of more than 0 but less than 3, preferably a value of from 2.0 to 2.2.

In the above formula (2), $R^3$ is a substituted or unsubstituted non-functional monovalent hydrocarbon group, and two $R^3$'s may together form a lower alkylene group. $R^3$ includes, for example, the groups mentioned above as exemplars of $R^2$.

By regulating the amount of the component (B) contained in the gel-forming silicone composition of the present invention, it is possible to control the modulus of elasticity of a gel-like cured product obtained upon curing of the composition. The larger the amount of the component (B) in the composition, the lower the modulus of elasticity of the resulting gel-like cured product. The amount of the component (B) preferably ranges from 10 to 150 parts by weight, more preferably from 50 to 100 parts by weight, per 100 parts by weight of the component (A). If the amount of the component (B) is too small, it is impossible to achieve a sufficient lowering in the modulus of elasticity of the gel-like cured product obtained. If the amount is too large, on the other hand, the component (B) bleeds out of the gel-like cured product.

The component (B) normally has a viscosity at 25° C. of from 20 to 10,000 cP. From the viewpoint of preventing the bleeding phenomenon, it is preferable that the viscosity of the component (B) at 25° C. is not higher than that of the component (A) and is, for example, on the order of 50 to 1,000 cP. Ordinary non-functional silicone oils have the drawback that the oils will bleed out of molded gel-like cured products. According to the present invention, on the other hand, by controlling the viscosity of the component (B) to be not higher than that of the component (A) it is possible to restrict the oil bleeding to within practically permissible ranges.

(C) Organohydrogenpolysiloxane

The organohydrogenpolysiloxane contains an average of from 1 to 3, preferably 1.5 to 2.5, more preferably 2, SiH groups (silicon-bonded hydrogen atoms) per molecule, and acts as a crosslinking agent. The SiH groups in the component (C) and the alkenyl groups in the component (A) described above perform an addition reaction, to form a gel-like cured product. The SiH groups may each be present at a terminal end or an intermediate position of the molecule. Such organohydrogenpolysiloxanes (C) include, for example, the compounds having the following average composition formula (3):

$$(R^4)_d H_e SiO_{(4-d-e)/2} \tag{3}$$

wherein $R^4$ is a substituted or unsubstituted monovalent hydrocarbon group, and d and e have values such that $0<d<3$, $0<e\leq 2$, and $1\leq d+e\leq 3$. There are no particular restrictions on the molecular structure of these compounds; the compounds may have any one or combination of linear, branched and cyclic structures.

In the above formula (3), $R^4$ is a substituted or unsubstituted monovalent hydrocarbon group, and two $R^4$ may together form a lower alkylene group. $R^4$ includes, for example, the groups mentioned above as exemplars of $R^2$.

The organohydrogenpolysiloxanes for use as component (C) may be used either singly or in combination of two or more.

Besides, among the organohydrogenpolysiloxanes applicable as the component (C), those having a viscosity of not more than 1,000 cP at 25° C. are preferred, in view of ease of synthesis.

For ensuring that the gel-forming silicone composition of the present invention can be cured without foaming and the resulting gel-like cured product has good heat resistance and physical properties, the amount of the component (C) in the composition is preferably such as to provide from 0.8 to 2.0 moles of SiH groups, more preferably from 0.9 to 1.2 moles, per mole of alkenyl groups in the component (A).

(D) Addition Reaction Catalyst

The addition reaction catalyst (D) for use in the present invention may be any catalyst that can promote the addition reaction between the alkenyl groups in the component (A) and the SiH groups in the component (C). For example, platinum group metal catalysts can be used. The platinum group metal catalysts include, for example, chloroplatinic acid, alcohol-modified chloroplatinic acids, coordination compounds of chloroplatinic acid with an olefin, vinylsiloxane or acetylene compound, tetrakis-(triphenylphosphine)palladium, chlorotris(triphenylphosphine)rhodium and the like, among which particularly preferred are platinum compounds.

In the composition of the present invention, the component (D) is normally present in an amount of from 0.1 to 100 ppm based on the total amount of the components (A) to (c).

Other Ingredients

In the gel-forming silicone composition according to the present invention, if necessary, a variety of known additives may be incorporated, in addition to the above-described components (A) to (D).

For example, inorganic fillers such as fumed silica, silica aerogel, precipitates silica, ground silica, diatomaceous earth, iron oxide, zinc oxide, titanium oxide, calcium carbonate, magnesium carbonate, zinc carbonate, carbon black and the like may be added to the gel-forming silicone composition of the present invention, whereby it is possible to control hardness, mechanical strength, etc. of the gel-like cured product obtained by curing the composition. Also, hollow inorganic fillers, hollow organic fillers, organosilicone resins, spherically shaped rubbery fillers and the like may be added to the composition. Further, reaction controlling agents such as cyclic polymethylvinylsiloxane compounds, acetylene compounds, organophosphorus compounds and the like can be added to the composition, thereby controlling the curing reaction of the composition. Moreover, an organohydrogenpolysiloxane having a SiH group (silicon-bonded hydrogen atom) in its molecule may be added to the composition, to thereby control hardness, etc. of the resulting cured product. The amounts of the additives to be incorporated into the inventive composition are not specifically limited, as far as the properties of the gel-like cured product obtained are not impaired.

Cured Product

A gel-like cured product can be easily obtained by mixing the above-described components (A) to (D) uniformly and, for example, letting the resulting mixture stand at 25° C. for about 24 hours or heating the mixture at 40° to 150° C. There are no special restrictions as to the order in which the components are to be mixed. For example, the components (A), (B) and (C) may be mixed uniformly, followed by addition of the component (D). Alternatively, the components (B) and (D) may be added to and mixed uniformly with a mixture of the components (A) and (C), immediately before curing.

The gel-like cured product of the present invention, obtained in the manner as above, has a complex modulus of elasticity as measured by the method specified in JIS H 7002 of not more than 2000, typically in the range from 800 to 1500, at 150° C.

EXAMPLES

The raw materials as follows were uniformly mixed in the amounts as given in Table 1 below, to prepare Compositions 1 to 6. Of the compositions prepared, Compositions 1 to 3 represent working examples of the present invention, and Compositions 4 to 6 comparative examples.

Raw Materials

Component (A)
 Polysiloxane-I
 An organopolysiloxane represented on the average by the formula:

$$(Me_3SiO_{0.5})_{2.0}(MeViSiO)_{1.0}(Me_2SiO)_{253}$$

wherein Me stands for the methyl group and Vi stands for the vinyl group, in this formula and hereinbelow (vinyl groups: 0.19 mol %, viscosity: 1000 cP).
 Polysiloxane-II
 An organopolysiloxane represented on the average by the formula:

$$(Me_3SiO_{0.5})_{0.75}(Me_2ViSiO_{0.5})_{0.17}(MeSiO_{1.5})_{1.0}(Me_2SiO)_{31.4}$$

(vinyl groups: 0.26 mol %, viscosity: 1300 cP).
 Polysiloxane-III
 An organopolysiloxane represented on the average by the formula:

$$(Me_3SiO_{0.5})_{2.0}(MeViSiO)_{2.3}(Me_2SiO)_{220}$$

(vinyl groups: 0.51 mol %, viscosity: 700 cP).
 Polysiloxane-IV
 An organopolysiloxane represented on the average by the formula:

$$(Me_2ViSiO_{0.5})_{0.58}(Me_2SiO)_{220}(Me_3SiO_{0.5})_{1.42}$$

(vinyl groups: 0.13 mol %, viscosity: 800 cP).
Component (B)
 Polysiloxane-V
 A non-functional organopolysiloxane represented on the average by the formula:

$$(Me_3SiO_{0.5})_{2.0}(Me_2SiO)_{250}$$

(viscosity: 1000 cP).
 Polysiloxane-VI
 A non-functional organopolysiloxane represented on the average by the formula:

$$(Me_3SiO_{0.5})_{0.92}(MeSiO_{1.5})_{1.0}(Me_2SiO)_{32}$$

(viscosity: 1200 cP).
Component (C)
 Polysiloxane-VII
 An organohydrogenpolysiloxane represented on the average by the formula:

$$(HMe_2SiO_{0.5})_{2.0}(Me_2SiO)_{18}$$

(viscosity: 20 cP).
 Polysiloxane-VIII
 An organohydrogenpolysiloxane represented on the average by the formula:

$$(HMe_2SiO_{0.5})_{1.0}(Me_2SiO)_{38}(Me_3SiO_{0.5})_{1.0}$$

(viscosity: 20 cP).
 Polysiloxane-IX
 An organohydrogenpolysiloxane represented on the average by the formula:

$$(Me_3SiO_{0.5})_{2.0}(HMeSiO)_{7.0}(Me_2SiO)_{8.0}$$

(viscosity: 15 cP).
 Polysiloxane-X
 An organohydrogenpolysiloxane represented on the average by the formula:

$$(Me_3SiO_{0.5})_{2.0}(HMeSiO)_{29}(Me_2SiO)_{51}$$

(viscosity: 100 cP).
Component (D)
 A chloroplatinic acid-vinylsiloxane complex (platinum content: 1 % by weight).

The above Compositions 1 to 6 were each heated at 150° C. for 30 minutes. Upon the heating, every one of the compositions gave a transparent gel-like cured product. The gel-like cured products thus obtained were measured for penetration and complex modulus of elasticity, according to the methods below. The results are set forth in Table 1.
Penetration
 Penetration of each gel-like cured product obtained by curing a composition was measured using a ¼-scale cone according to ASTM D 1403.
Complex Modulus of Elasticity
 Complex modulus of elasticity (G*) was measured at a temperature of 150° C and a frequency of 1 Hz by using a rheopexy analyzer produced by Iwamoto Seisakusho K.K., according to JIS H 7002.

TABLE 1

| Composition | Examples | | | Comparative Examples | | |
|---|---|---|---|---|---|---|
| | 1 | 2 | 3 | 4 | 5 | 6 |
| Component (A) | | | | | | |
| Polysiloxane-I | 100 | | | | | |
| Polysiloxane-II | | 100 | 100 | | | |
| Polysiloxane-III | | | | 100 | | |
| Polysiloxane-IV | | | | | 100 | 100 |
| Component (B) | | | | | | |
| Polysiloxane-V | 80 | | | | 70 | 5 |
| Polysiloxane-VI | | 30 | 95 | | | |
| Component (C) | | | | | | |
| Polysiloxane-VII | 4.86 | 2.4 | 5.6 | 5.2 | | |
| Polysiloxane-VIII | | 9.8 | | | | |
| Polysiloxane-IX | | | | | | 0.61 |
| Polysiloxane-X | | | | | 0.84 | |
| Component (D) | | | | | | |
| Catalyst | 0.1 | 0.07 | 0.1 | 0.05 | 0.09 | 0.05 |
| (SiH)/(SiCH=CH$_2$) | 1.15 | 1.0 | 1.0 | 0.47 | 1.15 | 1.15 |
| Penetration | 115 | 115 | 115 | 115 | 115 | 115 |
| Complex modulus of elasticity (dyn/cm$^2$) | 1040 | 1260 | 1340 | 2300 | 2050 | 2200 |

It is seen from the results set forth above that the gel-like cured products of Compositions 1 to 3, which are working examples of the present invention, have complex moduli of elasticity lower than those of the gel-like cured products of Compositions 4 to 6, which are comparative examples. This indicates that according to the present invention, it is possible to obtain gel-like cured products with low modulus of elasticity.

We claim:

1. A gel-forming silicone composition comprising:
   (A) an organopolysiloxane containing a silicon-bonded vinyl group in an average amount of from 0.15 to 0.35 mol % based on the amount of all the silicon-bonded organic groups contained in its molecule;
   (B) from 10 to 150 parts by weight per 100 parts by weight of the component (A), a non-functional organopolysiloxane other than (C) having the following average composition formula (2):

$$(R^3)_c SiO_{(4-c)/2} \quad (2)$$

wherein $R^3$ is a substituted or unsubstituted non-functional monovalent hydrocarbon group, and c has a value of from 2.0 to 2.2, component (B) having a viscosity at 25° C. not higher than the viscosity at 25° C. of the component (A);
   (C) an organohydrogenpolysiloxane containing an average of from 1 to 3 silicon-bonded hydrogen atoms per molecule present in an amount such that the amount of the silicon-bonded hydrogen atoms in the component (C) is from 0.8 to 2.0 moles per mole of the vinyl groups in the component (A); and
   (D) an addition reaction catalyst.

2. The composition of claim 1, wherein the component (A) has the following average composition formula (1):

$$(R^1)_a (R^2)_b SiO_{(4-a-b)/2} \quad (1)$$

wherein $R^1$ is a vinyl group, $R^2$ is a substituted or unsubstituted monovalent hydrocarbon group, and a and b have values such that $0<b<3$ and $0.0015 \leq a/(a+b) \leq 0.0035$.

3. The composition of claim 1, wherein the component (A) has a viscosity of from 400 to 3000 cP at 25° C.

4. The composition of claim 1, wherein the component (C) has the following average composition formula (3):

$$(R^4)_d H_e SiO_{(4-d-e)/2} \quad (3)$$

wherein $R^4$ is a substituted or unsubstituted monovalent hydrocarbon group, and d and e have values such that $0<d<3$, $0<e \leq 2$, and $1 \leq d+e \leq 3$.

5. A gel-like cured product obtained by curing the gel-forming silicone composition as claimed in claim 1.

6. The composition of claim 1, wherein the silicon-bonded organic groups, other than vinyl, in (A) and (C) are alkyl, cycloalkyl, aryl or aralkyl groups, or these groups substituted by halogen or cyano, or two organic groups together forming a lower alkylene group.

* * * * *